(12) United States Patent
Nalladega et al.

(10) Patent No.: US 10,908,106 B2
(45) Date of Patent: Feb. 2, 2021

(54) COATING ANALYSIS SYSTEM (71) Applicant: General Electric Company, Schenectady, NY (US)

(72) Inventors: Venkata Vijayaraghava Nalladega, Niskayuna, NY (US); Roger Dale Wustman, Mason, OH (US); Cathleen Ann Hoel, Schenectady, NY (US); Margeaux Wallace, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 301 days.

(21) Appl. No.: 16/046,600

(22) Filed: Jul. 26, 2018

(65) Prior Publication Data

US 2020/0033276 A1    Jan. 30, 2020

(51) Int. Cl.
*G01N 25/72* (2006.01)
*G01L 1/24* (2006.01)

(52) U.S. Cl.
CPC .............. *G01N 25/72* (2013.01); *G01L 1/248* (2013.01)

(58) Field of Classification Search
CPC .......... G01N 25/72; G01L 1/248; F01D 5/288
See application file for complete search history.

(56) References Cited

U.S. PATENT DOCUMENTS

| | | | |
|---|---|---|---|
| 3,206,603 A * | 9/1965 | Mauro | G01N 25/72 250/341.6 |
| 6,042,898 A | 3/2000 | Burns et al. | |
| 6,537,605 B1 * | 3/2003 | Kirchner | C23C 4/00 118/302 |
| 6,762,396 B2 * | 7/2004 | Abbott | F27D 11/02 118/724 |
| 7,425,093 B2 * | 9/2008 | Wickersham, Jr. | C23C 14/3407 356/314 |
| 7,690,840 B2 | 4/2010 | Zombo et al. | |
| 7,918,141 B1 | 4/2011 | Reitz et al. | |
| 8,221,825 B2 | 7/2012 | Sathish et al. | |
| 8,749,629 B2 | 6/2014 | Baleine et al. | |

(Continued)

FOREIGN PATENT DOCUMENTS

CN    106324034 A    1/2017

OTHER PUBLICATIONS

Bison et al., "Inspecting thermal barrier coatings by IR themography", Proceedings vol. 5073, Thermosense XXV, Orlando, Florida, Apr. 1, 2003.

(Continued)

*Primary Examiner* — Nathaniel T Woodward
*Assistant Examiner* — Philip L Cotey
(74) *Attorney, Agent, or Firm* — Christopher R. Carroll; The Small Patent Law Group LLC (57) ABSTRACT

A coating analysis system and method inductively heat a component having a coating. Optionally, the component is heated while a cooling fluid flows through cooling holes extending through the component and the coating. The system and method measure rates of infrared radiation emission from the component and the coating at different locations on the component and the coating. The system and method determining bond qualities (e.g., tensile strengths of bonds) between the coating and the component at the different locations based on the rates of infrared radiation emission that are measured.

19 Claims, 3 Drawing Sheets

(56) References Cited

U.S. PATENT DOCUMENTS

| | | | |
|---|---|---|---|
| 9,176,082 B2 | 11/2015 | Mistral | |
| 2003/0115941 A1* | 6/2003 | Srivastava | G01N 21/6489 |
| | | | 73/114.79 |
| 2005/0008215 A1* | 1/2005 | Shepard | G01N 25/72 |
| | | | 382/141 |
| 2005/0147150 A1* | 7/2005 | Wickersham, Jr. | G06T 7/0004 |
| | | | 374/120 |
| 2007/0134518 A1* | 6/2007 | Feist | C09K 11/7787 |
| | | | 428/701 |
| 2009/0122832 A1* | 5/2009 | Feist | C23C 4/12 |
| | | | 374/161 |
| 2010/0296943 A1 | 11/2010 | Lee et al. | |
| 2015/0307978 A1* | 10/2015 | Levy | H05B 6/101 |
| | | | 427/8 |
| 2016/0146670 A1* | 5/2016 | Chlebowski | G01J 5/0003 |
| | | | 250/341.6 |
| 2017/0254761 A1 | 9/2017 | Ahmadian et al. | |
| 2018/0005368 A1 | 1/2018 | Nalladega et al. | |

OTHER PUBLICATIONS

Eldridge et al., "Monitoring Delamination Progression in Thermal Barrier Coatings by Mid-Infrared Reflectance Imaging", International Journal of Applied Ceramic Technology, Apr. 4, 2006.

Dynamic-Ceramic Ltd., "Material Properties", United Kingdom.

* cited by examiner

COATING ANALYSIS SYSTEM

FIELD

The subject matter described herein relates to coating inspection systems.

BACKGROUND

Components used in some harsh environments can include coatings to help protect the underlying substrate materials of the components, to improve performance of the components, or the like. For example, thermal barrier coatings can be applied to components such as turbine blades to reduce thermal damage to the underlying components and to lengthen the useful life of the components. The coating may be bonded to the underlying component when the coating is sprayed or otherwise applied to the underlying component. For example, the coating may be chemically bonded to the underlying component or mechanically bonded using a rough surface of the underlying component.

The coating can deteriorate over time. As the number of duty cycles of a coated component increases and/or as the coated component operates in harsher environments, the quality of the bond or delamination between the coating and the component can decrease. For example, the tensile bond strength of a bond at an interface between the coating and the component can decrease over time. If the bond strength decreases too much, then the coating can delaminate and spall off the component.

Current techniques for examining coatings include visually inspecting coated components for spalling or other indicators of delamination. But, visual inspection of coated components may be limited to finding larger delamination of the coatings and other surface defects. Smaller delamination of the coating may not be visible. For example, in a stage one turbine blade, indications of delamination around cooling holes in the turbine blade can be difficult to visually detect. Other techniques for examining coatings include measuring eddy currents or using flash infrared detection. But, these techniques lack the resolution and sensitivity for finding smaller defects.

BRIEF DESCRIPTION

In one embodiment, a method for analyzing a quality of a bond between a coating and an underlying component includes inductively heating the component, measuring a rate of radiation emission from the component and the coating from inductively heating the component, and determining the quality of the bond or delamination between the coating and the component based on the rate of radiation emission that is measured.

In one embodiment, a coating analysis system includes a heating system configured to inductively heat a component having a coating, and an inspection system configured to measure a rate of radiation emission from the component and the coating from inductively heating the component. The inspection system also is configured to determine a quality of a bond or delamination between the coating and the component based on the rate of radiation emission that is measured.

In one embodiment, a coating analysis method includes inductively heating a component having a thermal barrier coating while a cooling fluid flows through one or more cooling holes that extend through the component and the thermal barrier coating, measuring rates of infrared radiation emission from the component and the thermal barrier coating from inductively heating the component at different locations on the component and the thermal barrier coating, and determining tensile strengths of bonds between the thermal barrier coating and the component at the different locations based on the rates of infrared radiation emission that are measured.

DETAILED DESCRIPTION

One or more embodiments herein described provide coating analysis systems that use infrared measurements to evaluate the tensile strengths of bonds between coatings and underlying components. While the description herein focuses on evaluating the bond quality of thermal barrier coatings on turbine blades, not all embodiments are limited to thermal barrier coatings on turbine blades. One or more embodiments of the systems and methods can evaluate the bond strength between thermal barrier coatings on components other than turbine blades, can evaluate the bond strength between coatings other than thermal barrier coatings on turbine blades, and/or can evaluate the bond strength between coatings other than thermal barrier coatings on components other than turbine blades.

One embodiment of the analysis system can include a heating system for heating a component that possesses a coating such that the heating system generates a temperature difference between the component and the coating. The component may be a metallic component formed from one or more metals or metal alloys, and the coating can be a thermal barrier coating. Alternatively, the component can be formed from one or more ceramic matrix composites. The coating can be formed from an electrically insulative material (e.g., zirconia), or can be formed from an electrically and thermally conductive material.

The analysis system also can include an inspection system, such as an infrared (IR) sensor-based inspection system. This inspection system detects rates at which IR radiation is emitted from the coating as a function of the degree of bonding strength of the coating to the component. For example, coatings having stronger bonds between the coating and the component (e.g., greater tensile bonding strength) will have faster rates of IR emission from the component, while coatings having weaker bonds will have slower rates of IR emission from the component. The analysis system can use a computer vision system and machine learning algorithm that determines the quality of the bond or delamination between the coating and component based on the rate or rates of IR emission from the coating as the component is heated. The computer vision system and machine learning algorithm can determine the quality of the bond or delamination between coating and component as a function of location on the component.

In operation, the analysis system can heat the component that possesses the coating such that there is a temperature difference between the component and the coating. In one embodiment, the component can be heated using inductive heating. Alternatively, the component can be heated in another way, such as by directing a heated fluid (e.g., heated air) through the component (e.g., through cooling holes of a turbine blade). The component is heated to a temperature that is hotter than ambient temperature.

The heated component that possesses the coating is inspected using an IR sensor of a selected bandwidth, such as medium bandwidth (e.g., at least three microns to no more than eight microns), a long bandwidth (e.g., greater than eight microns to no more than fifteen microns), or another bandwidth range. The analysis system assesses the rate at which IR radiation is emitted from the component over an area of interest of the component during the transient heating of the component. This area of interest can be a portion of the surface area of the coating that is under inspection. The rate of emission of IR radiation from the component is sensitive to the degree of bonding of the coating to the substrate. For example, if the coating is well bonded, the rate of emission of IR radiation is faster. Alternatively, if the coating is not well bonded, the rate of emission of IR radiation is slower. Accordingly, areas of the coating on the component that are well bonded and not well bonded can be differentiated from each other.

The components can be classified according to the bond quality of the coatings to the components. The classified components can be selected for use according to requirements of the use. For example, components that are grouped or classified as having the strongest tensile bond strengths can be selected for the highest performance applications, such as uses that involve the components being exposed to elevated temperatures for longer periods of time, uses that involve the components being thermally cycled more times, and/or uses that involve the components being used more often (relative to other groups or classifications of components). Components that are grouped or classified having weaker (but not the weakest) tensile bond strengths can be selected for average or mean performance applications, such as uses that involve the components being exposed to cooler than the highest performance components for shorter periods of time and/or that involve the components being used less often (relative to the highest performance components). Components that are grouped or classified as having the weakest tensile bond strengths can be selected for scrapping the components (e.g., discarding the turbine blades) or for reprocessing (e.g., restoring the coating, or removing and re-applying a new coating).

The quality of the bond on the component can be measured and the analysis system can establish a gauge that indicates the areas or locations of stronger coating bonds. In one embodiment, the analysis system can calculate a derivative to be used to classify the components, such the difference in the rates of IR emission from different locations on the same component, or the difference in the rate of IR emission from a location on a component being examined and a calibrated or designated rate of IR emission. The calibrated or designated rate can be obtained from previous measurements of IR emission rates of components known to have tensile bond strengths that exceed a designated threshold. In one embodiment, different designated or calibrated rates can be associated with different classifications or groups described above.

In one embodiment, the analysis system does not calculate a quantified number or value for the tensile bond strength between a coating and a component. Instead, the analysis system can compare the IR emission rates of different coated components, and determine relative bond strengths based on the comparisons. For example, a first component having faster IR emission rates than a second component may be identified as having stronger tensile bond strengths than the second component, even though no tensile value is calculated.

The analysis system can estimate a remaining useful life or service of the coating on the components, or can rank the components, based on the tensile bond strengths between the coatings and components. The components having stronger tensile bond strengths can be identified as having longer remaining useful lives than components with weaker tensile bond strengths.

The analysis system can be used to evaluate bond strengths in new and/or used components. For example, some components may be inspected at periodic or aperiodic intervals. This inspection can involve determining the tensile bond strengths of the coatings in various locations on a component. Depending on the tensile bond strengths that are determined, the analysis system can schedule or re-schedule a follow-up inspection on the component. For example, if the bond strength is identified as being weakened, then the analysis system can re-schedule the next inspection of the component to occur sooner than previously scheduled. As another example, if the bond strength is identified as being weakened, then the analysis system can schedule or implement a restoration of the coating. As another example, if the bond strength is identified as being weakened, then the analysis system can change one or more missions that the component is to operate within. For example, a coated component found to have weakened bond strengths may be rescheduled from operating for a long period of time in elevated temperatures to operating for a reduced period of time and/or in reduced temperatures.

Optionally, cooling air can be directed through cooling holes in the coated component by a cooling circuit. The cooling circuit can include a compressor, pump, or other source of air that is cooler than the heated component. The cooling circuit can direct the cool air through the cooling holes of the component, which can change the rate of IR emission in locations around the cooling holes (relative to not directing the cooling air through the cooling holes). The analysis system can examine the rates of IR emission around the cooling holes of components to evaluate the bond strengths between the coatings and the components around the cooling holes.

In another embodiment, the tensile bond strength between a coating and component can be evaluated by heating the component (e.g., using induction heating, by directing heated air into and/or around the component, or the like) and a thermal image of the component and coating can be obtained. If the coating has delaminated from the component, then the location of the delamination will appear as a cooler area in the thermal image. This can allow the analysis system to obtain a single IR image of the component to determine if any part of the coating appearing in the image has delaminated from the component.

The analysis systems described herein provide non-destructive ways to measure the tensile bond strengths of coatings. Using infrared measurement does not damage or destroy the coating or bond between the coating and underlying substrate, while other tensile strength measurements can be destructive of the coating and/or bond.

Figure 1:
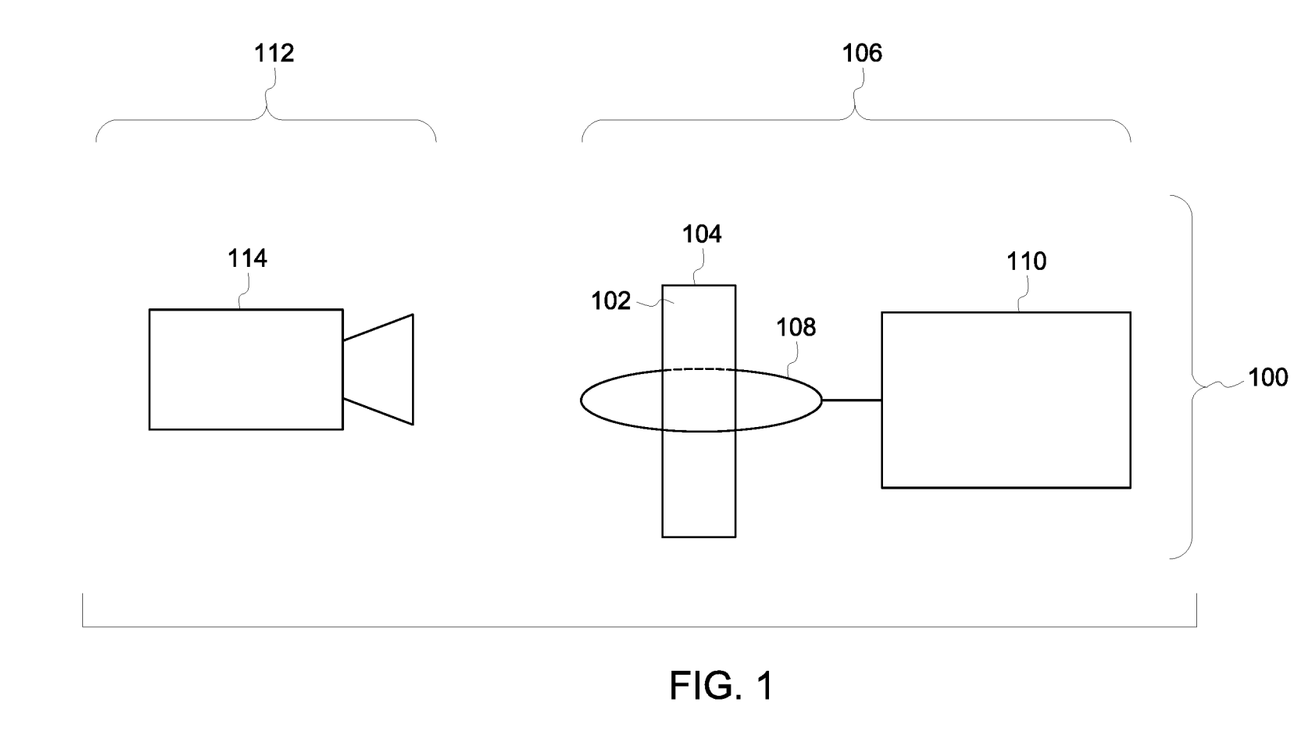
FIG. 1 illustrates a perspective view of one embodiment of an coating analysis system.
Figure 2:
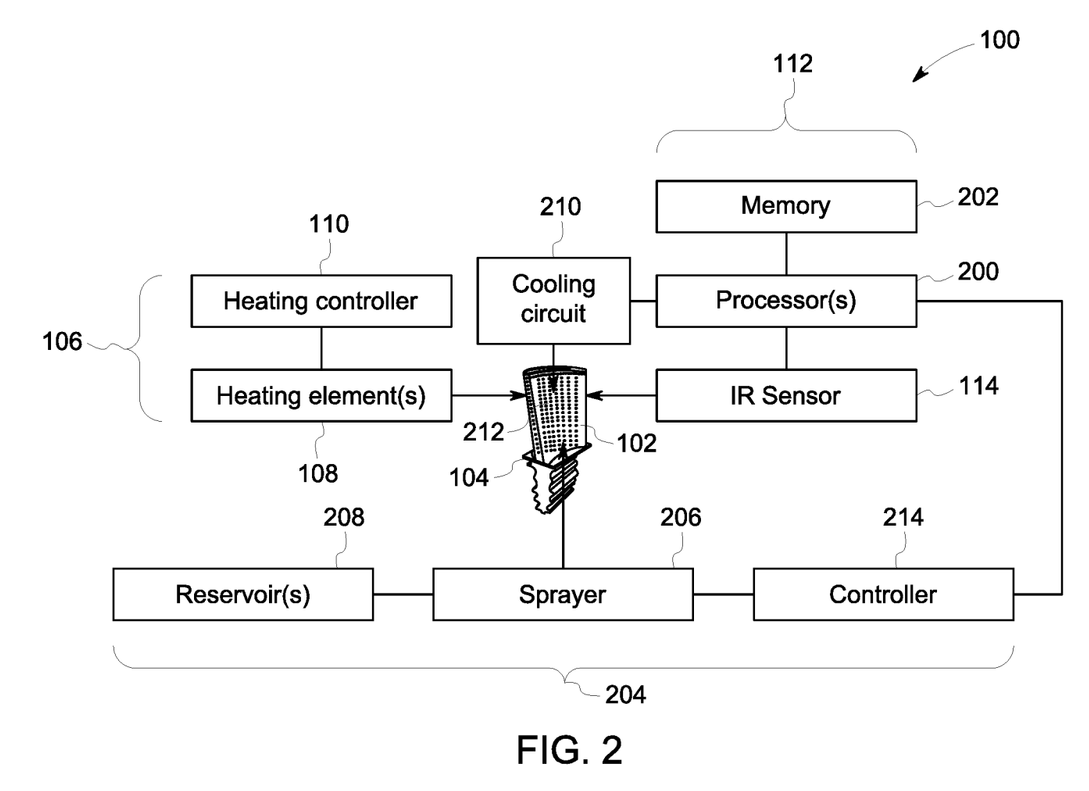
FIG. 2 illustrates a schematic view of the analysis system shown in FIG. 1.

FIG. 1 illustrates one embodiment of a coating analysis system 100. FIG. 2 illustrates a schematic view of the analysis system 100 shown in FIG. 1. The analysis system 100 examines the tensile bond strength between a coating 102 and an underlying component 104. In the illustrated embodiment, the coating 102 is a thermal barrier coating and the component 104 is a turbine blade.

The analysis system 100 includes a heating system 106 that has one or more heating elements 108 and a heating controller 110. The heating elements 108 shown in FIG. 1 are conductive coils through which an electric current is passed. The coils are placed or moved over or around the coated component 104 such that passage of the current through the coils inductively heats the component 104. Alternatively, the heating elements 108 can include heaters and fans that heat air that is blown over the coated component 104 to heat the component 104. The heating controller 110 includes hardware circuitry that controls operation of the heating elements 108. For example, the heating controller 110 can include one or more processors (e.g., microprocessors, integrated circuits, field programmable gate arrays, etc.) that control conduction of current into the heating elements 108.

The analysis system 100 also includes an inspection system 112 that has an IR sensor 114. The IR sensor 114 can be an IR camera or other device that senses the amount of radiation emitted from surfaces of the coating 102. One or more processors 200 (shown in FIG. 2) control operation of the IR sensor 114. The processors 200 can receive data output by the IR sensor 114 that indicates the sensed IR radiation emitted at different locations on the coated component 104. For example, the processors 200 can receive data representing the heat of the coating 102 at different locations, the rate at which IR radiation is emitted at different locations, and/or an IR image of the coated component 104.

Figure 3:
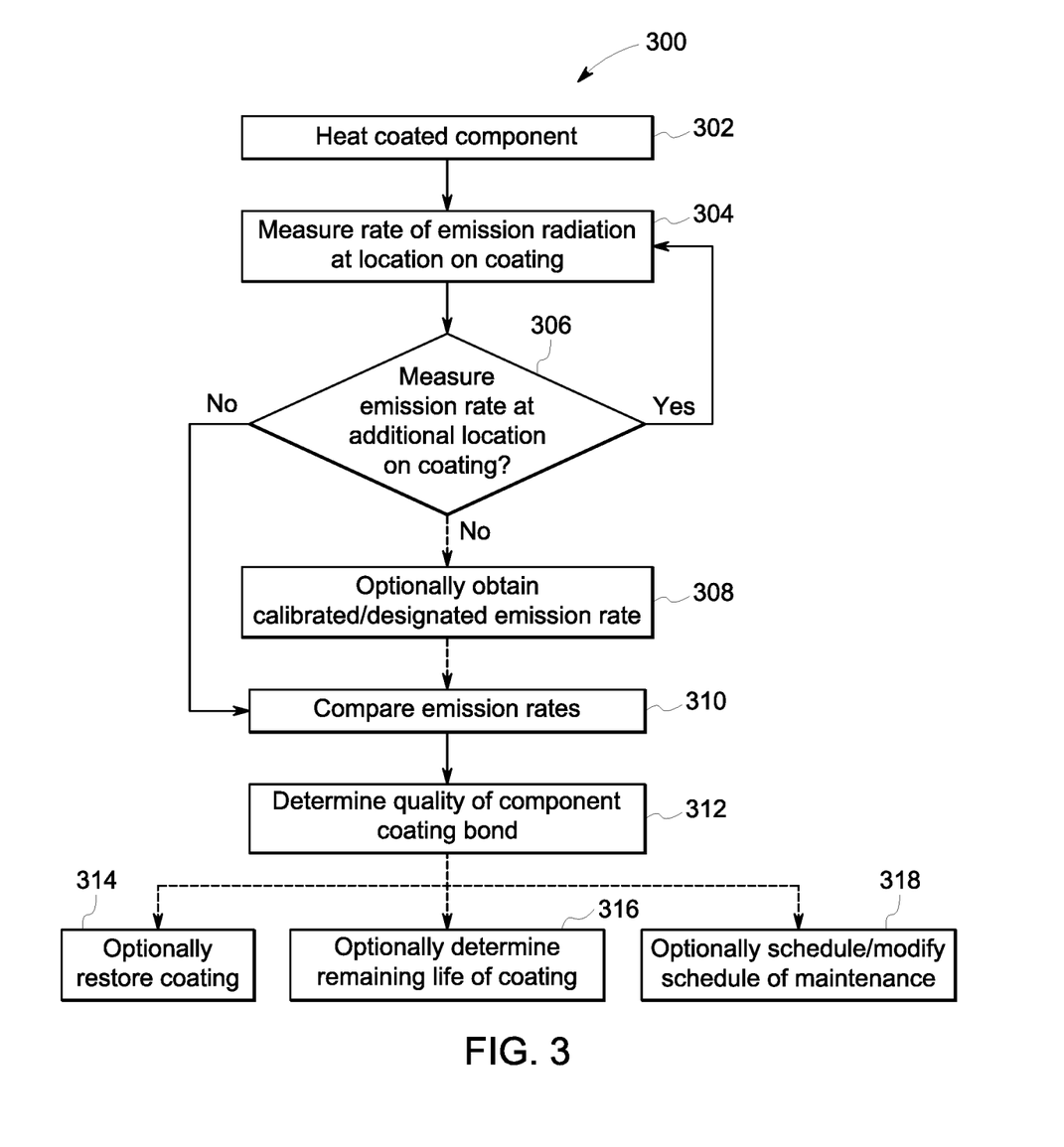
FIG. 3 illustrates a flowchart of one embodiment of a method for examining a tensile bond strength between a coating and an underlying component shown in FIG. 1.

With continued reference to the analysis system 100 shown in FIGS. 1 and 2, FIG. 3 illustrates a flowchart of a method 300 for examining a tensile bond strength between the coating 102 and the underlying component 104. The method 300 includes operations that can be performed by the analysis system 100 shown in FIGS. 1 and 2 in one embodiment. At 302, the coated component 104 is heated. The component 104 may be heated by the heating controller 110 of the heating system 106 directing current to flow through the heating elements 108 to inductively heat the component 104 beneath the coating 102. The component 104 may be heated by the heating elements 108 while the coating 102 is not heated. For example, the component 104 can be formed from one or more metals and/or ceramic matrix composites that are heated when exposed to a magnetic field created by conduction of electric current through the coils of the heating element 108. The coating 102 may be formed from one or more materials that are not heated when exposed to the magnetic field created by the heating element 108. For example, the coating 102 can be formed from one or more dielectric or electrically insulative materials.

At 304, a rate at which radiation is emitted from one or more locations on the coating 102 is measured. The radiation emission rate can represent how quickly IR radiation comes off the coating 102 due to the heating of the underlying component 104. The radiation emission rate can be measured by the IR sensor 114. For example, the IR sensor 114 can measure how rapidly radiation is emitted off or from one or more locations on the coating 102 being examined. The radiation can be measured by determining how quickly the IR radiation is coming off the coating 102. This contrasts with measuring the magnitude of the IR radiation emitted from a location. For example, instead of merely measuring how much radiation is emitted from a location, the processors 200 can examine how quickly the emitted radiation changes, or the rate at which the radiation is emitted off the coating 102. Alternatively, at 304, an IR image of the coated component 104 is obtained. The IR image can be obtained by the sensor 114, and can have areas with different brightness or color to indicate different amounts of IR radiation emission.

Optionally, the rate of IR radiation emission from the coating 102 is measured while a cooling fluid is flowing through one or more cooling holes 212 (shown in FIG. 2) extending through at least part of the component 104 and through the coating 102. The cooling holes 212 may be conduits or other openings extending through portions of the component 104. A cooling fluid, such as air that is at or below room temperature or that is at or below the temperature to which the component 104 is heated, is directed into and through the cooling holes 212 in the component 104. For example, a cooling circuit 210 (shown in FIG. 2) can include one or more pumps, compressors, fans, or the like, that are controlled by the processors 200 to direct the cooling fluid into internal conduits of the component 104. This cooling fluid can exit the internal conduits via the cooling holes 212 extending out of the component 104. The IR sensor 114 can measure the rate of IR radiation emission from locations that are near (e.g., within one to three millimeters) cooling holes in the component 104 while the cooling fluid is exiting the component 104 via the cooling holes to provide a more accurate determination of the bond strength at or near the cooling holes. The geometry of the cooling holes 212 can cause the IR radiation emission at or near the cooling holes 212 to appear to be larger (and therefore appear to have stronger bond strengths) than the IR radiation emission actually is. Measuring the IR radiation emission rate while the cooling fluid is flowing out of the cooling holes 212 can provide a more accurate measurement of the IR radiation emission rate.

At 306, a determination is made as to whether the rate of IR radiation emission is to be measured at one or more additional locations on the coating 102 of the same component 104. The analysis system 100 can measure the IR radiation emission rate at several locations on the coating 102 of the same component 104, or can measure the IR radiation emission rate at a single location on the coating 102. If the rate is to be measured at one or more additional locations, then flow of the method 300 can return toward 304. Alternatively, if the rate is only to be measured at a single location, then flow of the method 300 can proceed toward 308 or 310. In another example, if the rate is to be measured at several locations, and the rate has been measured at all the locations, then flow of the method 300 can proceed toward 308 or 310.

The method 300 optionally includes the operation at 308 such that one embodiment of the method 300 can proceed from 306 toward 308 and then toward 310. Alternatively, the method 300 may not include the operation of 308 such that another embodiment of the method 300 can proceed from 306 toward 310, as shown in FIG. 3.

At 308, a calibrated or designated rate of IR radiation emission is obtained. This calibrated or designated rate can represent a quality (e.g., tensile strength) of a bond between a coating and a component. For example, the calibrated or designated rate can be a previously measured or calculated rate associated with a designated tensile bond strength. Optionally, several calibrated or designated rates can be obtained, with different calibrated or designated rates corresponding with different tensile bond strengths. The calibrated or designated rate(s) of IR radiation emission can be obtained by the processors 200 from one or more tangible and non-transitory computer readable storage media, such as a computer memory 202 (shown in FIG. 2). The memory 202 can represent one or more computer hard drives, flash drives, optical discs, or the like.

At 310, IR emission rates are compared. In one embodiment, the processors 200 can compare the rates of IR emission measured at two or more different locations on the same coating 102 on the same component 104. The rates can be compared by determining whether one location on the coating 102 is associated with a faster or slower IR emission rate than one or more (or all) other locations on the same coating 102.

Optionally, the processors 200 can compare the rate(s) of IR emission measured at one or more locations on a coating 102 of a first component 104 with the rate(s) of IR emission measured at one or more locations on a coating 102 of another, second component 104. The rates can be compared by determining whether the coating 102 of the first component 104 is associated with a faster or slower IR emission rate than the coating 102 of the second component 104.

Optionally, the processors 200 can compare the rate(s) of IR emission measured at one or more locations on a coating 102 of a component 104 being examined with one or more calibrated or designated rate(s) of IR emission. The rates can be compared by determining whether the coating 102 of the component 104 being examined is associated with a faster or slower IR emission rate than the calibrated or designated rate(s).

At 312, a quality of the bond or delamination between the coating 102 and the component 104 being examined is determined for one or more locations on the coating 102. The quality of the bond or delamination that is determined can be a tensile strength of the bond between the coating 102 and the component 104.

In one embodiment, the bond quality is determined as a relative evaluation and not as an absolute value. For example, the rates of IR emission can be measured at two or more different locations on the same coating 102 of a single component 104. The processors 200 can compare the IR emission rates at the different locations, and determine if any of the locations is associated with an IR emission rate that is significantly different (faster or slower) than the other locations. An IR emission rate at one location may be significantly different from IR emission rates measured at another location if the IR emission rates measured at the locations differ by at least 10%, by at least 15%, or by at least 20%, or by at least a user-defined amount in different embodiments. If the IR emission rate at a first location on a coating 102 is significantly slower than the IR emission rate at a different, second location on the same coating 102, then the processors 200 can determine that the quality of the bond or delamination between the coating 102 and the component 104 at the first location is poorer than at the second location. For example, the processors 200 can determine that the tensile strength of the bond between the coating 102 and the component 104 at the first location is significantly weaker than the tensile strength of the bond between the coating 102 and the component 104 at the second location. Alternatively, the processors 200 can determine that the coating 102 has delaminated or is likely to have delaminated from the component 104 at the first location based on the significantly slower rate of IR radiation emission at the first location.

As another example, the rates of IR radiation emission measured at one or more locations on a first coating 102 of a first component 104 can be compared with the rates of IR radiation emission measured at one or more locations on a second coating 102 of another, second component 104. The processors 200 can compare these IR emission rates at the different locations, and determine if any of the locations is associated with an IR emission rate that is significantly different (faster or slower) than the other locations. An IR emission rate at one location on the coating 102 of the first component 104 may be significantly different from an IR emission rate measured at a location on the coating 102 of the second component 104 if the IR emission rates measured on the coatings 102 differ by one or more of the thresholds described above. If the IR emission rate measured on the coating 102 of the first component 104 is significantly slower than the IR emission rate measured on the coating 102 of the second component 104, then the processors 200 can determine that the quality of the bond or delamination between the coating 102 and the first component 104 is poorer than the quality of the bond or delamination between the coating 102 and the second component 104. For example, the processors 200 can determine that the tensile strength of the bond between the coating 102 and the first component 104 is significantly weaker than the tensile strength of the bond between the coating 102 and the second component 104. Alternatively, the processors 200 can determine that the coating 102 on the first component 104 has delaminated or is likely to have delaminated based on the significantly slower rate of IR radiation emission measured on the coating 102 of the first component 104.

As another example, the rates of IR radiation emission measured at one or more locations on a coating 102 of a component 104 can be compared with a calibrated or designated IR radiation emission rate. The processors 200 can compare the measured IR emission rate with the calibrated or designated rate, and determine if the measured IR emission rate is different (faster or slower) than the calibrated or designated rate. For example, if the IR emission rate measured on the coating 102 is slower (significantly slower in one embodiment, or slower by any measurable amount in another embodiment) than the calibrated or designated IR emission rate, then the processors 200 can determine that the quality of the bond or delamination between the coating 102 and the component 104 is poor (e.g., is a weak bond). For example, the calibrated or designated rate can be associated with an acceptable tensile bond strength, and the processors 200 can determine that the coating 102 has a weaker bond strength to the component 104 if the measured rate is slower than the calibrated or designated rate. This may indicate that the component 104 has a short remaining useful life, or can no longer safely operate.

Optionally, the processors 200 can compare the measured rates of IR radiation emission with several different calibrated or designated rates of IR radiation emission. The different calibrated or designated rates of IR radiation emission can be associated with different qualities of bonds between coatings 102 and components 104. For example, the slowest calibrated or designated rate of IR radiation emission can be associated with the weakest tensile bond strength between a coating 102 and a component 104, a faster calibrated or designated rate of IR radiation emission can be associated with a stronger tensile bond strength between a coating 102 and a component 104, an even faster calibrated or designated rate of IR radiation emission can be associated with an even stronger tensile bond strength between a coating 102 and a component 104, and so on. The processors 200 can determine whether the measured IR radiation emission rate is faster than a first calibrated or designated rate (but not faster than the next, second calibrated or designated rate), and determine that the bond between the coating 102 and the component 104 being examined is at least as strong as the tensile bond strength associated with the first calibrated or designated rate).

Optionally, the system 100 can determine a better quality bond for slower rates of IR radiation emission. For example, some coatings 102 may be conductive (e.g., metallic) coatings on a component 104 having lower conductivity compared with the coating 102. For such a scenario, slower rates of IR radiation emission may indicate stronger tensile strengths in the bond between the coating 102 and the component 104.

The method 300 optionally includes one or more responsive operations that can be performed based on and/or responsive to determining the bond quality between the coating 102 and the component 104. As one example, at 314, at least part of the coating 102 on the component 104 can be restored. The processors 200 can determine that the bond strength between the coating 102 and component 104 is too weak to continue operation of the component 104 or demonstrates delamination of the coating 102. Responsive to determining that the bond strength is too weak (e.g., the bond strength is below a designated bond tensile strength threshold), the processors 200 can direct a coating restoration system 204 to restore at least part of the coating 102 on the component 104. The restoration system 204 includes a sprayer 206 that sprays the fluid constituents or parts of the coating 102 onto the component 104 to restore the coating 102 and/or to form a new coating 102 on the component 104. Alternatively, the restoration system 204 can include another type of applicator that applies the fluid constituents or parts of the coating 102 onto the component 104 to restore the coating 102 and/or to form a new coating 102 on the component 104. The constituents or parts of the coating 102 (e.g., the chemical components that form the coating 102) can be obtained from one or more reservoirs 208, and a controller 214 of the restoration system 204 represents hardware circuitry that includes and/or is connected with one or more processors. The controller 214 can receive a control signal that can be automatically generated and communicated from the processors 200 responsive to determining a weak bond quality of the existing coating 102 and component 104. This control signal can direct the controller 214 to automatically control the sprayer 206 to begin spraying a restorative coating on the component 104.

As another example of an optional operation of the method 300, at 316, a remaining useful life or service life of the component 104 can be determined based on the bond quality that is determined. The remaining useful life or service life can be a number of duty cycles, a length of time, or the like, that the component 104 can continue operating with the coating 102 before the coating 102 is expected to need repair or restoration, or the component 104 is no longer able to safely operate. Several different designated remaining useful lives or service lives can be associated with (e.g., stored with) different tensile bond strengths and/or rates of IR radiation emission in the memory 202. The processors 200 can determine which of the different designated tensile bond strengths and/or rates of IR radiation emission that the determined tensile bond strength or measured rate of the coating 102 is closest to, and can determine that the remaining useful life or service life associated with that designated strength or rate is the remaining useful life or service life of the coating 102 and/or component 104. The remaining useful life or service life of the coating 102 and/or component 104 can be communicated to an operator of the analysis system 100, such as by displaying the remaining useful life or service life of the coating 102 and/or component 104 on a display device (not shown), such as a computer monitor, touchscreen, mobile electronic device, or the like.

As another example of an optional operation of the method 300, at 318, a maintenance schedule of the component 104 can be created or modified based on the bond quality that is determined. For bond strengths that are determined by the processors 200 to be weaker, the processors 200 can modify an existing maintenance schedule of the component 104 and/or create the maintenance schedule so that the component 104 is inspected, repaired, and/or replaced sooner than for coatings 102 found to have stronger bond strengths. This can help ensure that the components 104 having weaker bonds with the coatings 102 are inspected and/or replaced sooner than components 104 having stronger bonds with the coatings 102.

In one embodiment, a method for analyzing a quality of a bond or delamination between a coating and an underlying component includes inductively heating the component, measuring a rate of radiation emission from the component and the coating from inductively heating the component, and determining the quality of the bond or delamination between the coating and the component based on the rate of radiation emission that is measured.

Optionally, the component is a metallic component formed from one or more metals or metal alloys.

Optionally, the component is formed from one or more ceramic matrix composites.

Optionally, the quality of the bond or delamination is determined based on a relative difference between the rates of radiation emission at the different locations.

Optionally, the quality of the bond or delamination is determined as a function of location on the component.

Optionally, the quality of the bond or delamination represents a tensile strength of an interface between the component and the coating.

Optionally, determining the quality of the bond or delamination includes comparing the rate of radiation emission from a designated rate of radiation emission and determining the quality of the bond or delamination based on a difference between the rate of radiation emission that is measured and the designated rate.

Optionally, determining the quality of the bond or delamination includes, measuring the rate of radiation emission at plural different locations on the coating, comparing the rates of radiation emission that are measured at the different locations, and determining the quality of the bond or delamination based on one or more differences between the rates of radiation emission that are measured at the different locations.

Optionally, the quality of the bond or delamination is determined to be stronger for faster rates of radiation emission than for slower rates of radiation emission.

Optionally, measuring the rate of radiation emission includes measuring the rate at which infrared radiation is emitted from the component and the coating.

Optionally, determining the quality of the bond or delamination includes calculating a derivative of the rate of radiation emission and basing the quality of the bond or delamination on the derivative that is calculated.

Optionally, the derivative that is calculated includes a difference between a first rate of radiation emission at a first location on the coating and a second rate of radiation emission at a different, second location on the coating.

Optionally, the method also includes determining a remaining useful life of the coating based on the quality of the bond or delamination that is determined.

Optionally, measuring the rate of radiation emission from the component and the coating occurs while a cooling fluid is flowing through one or more cooling holes extending through at least part of the component and through the coating.

Optionally, the coating is a thermal barrier coating.

Optionally, the thermal barrier coating can be an electrically insulative coating.

Optionally, the thermal barrier coating can be an electrically conductive coating.

Optionally, the thermal barrier coating is formed from a material having a low electrical conductivity. For example, the thermal barrier coating can be formed from zirconia or a material having a resistivity that is at least $10^8$ ohms*cm at 25 degrees Celsius.

Optionally, the method also includes restoring at least a portion of the coating responsive to determining that the quality of the bond or delamination between the coating and the component is below a designated threshold.

In one embodiment, a coating analysis system includes a heating system configured to inductively heat a component having a coating, and an inspection system configured to measure a rate of radiation emission from the component and the coating from inductively heating the component. The inspection system also is configured to determine a quality of a bond between the coating and the component based on the rate of radiation emission that is measured.

Optionally, the inspection system is configured to determine the quality of the bond or delamination as a function of location on the component.

Optionally, the inspection system is configured to determine a stronger quality of the bond or delamination for faster rates of radiation emission than for slower rates of radiation emission.

Optionally, the inspection system is configured to measure the rate of radiation emission by measuring the rate at which infrared radiation is emitted from the component and the coating.

Optionally, the inspection system is configured to determine the quality of the bond or delamination by calculating a derivative of the rate of radiation emission and basing the quality of the bond or delamination on the derivative that is calculated.

Optionally, the derivative that is calculated by the inspection system includes a difference between a first rate of radiation emission at a first location on the coating and a second rate of radiation emission at a different, second location on the coating.

Optionally, the inspection system is configured to determine a remaining useful life of the coating based on the quality of the bond or delamination that is determined.

Optionally, the inspection system is configured to measure the rate of radiation emission from the component and the coating while a cooling fluid is flowing through one or more cooling holes extending through at least part of the component and through the coating.

In one embodiment, a coating analysis method includes inductively heating a component having a thermal barrier coating while a cooling fluid flows through one or more cooling holes that extend through the component and the thermal barrier coating, measuring rates of infrared radiation emission from the component and the thermal barrier coating from inductively heating the component at different locations on the component and the thermal barrier coating, and determining tensile strengths of bonds between the thermal barrier coating and the component at the different locations based on the rates of infrared radiation emission that are measured.

Optionally, the tensile strengths of the bonds are determined to be greater for faster rates of radiation emission than for slower rates of radiation emission.

Optionally, determining the tensile strengths of the bonds includes calculating one or more derivatives of the rates of infrared radiation emission and basing the tensile strengths of the bonds on the one or more derivatives that are calculated.

Optionally, the method also includes determining a remaining useful life of the thermal barrier coating based on the tensile strengths of the bonds that are determined.

Optionally, the method also includes restoring at least a portion of the thermal barrier coating responsive to determining that at least one of the tensile strengths of the bonds between the thermal barrier coating and the component is below a designated threshold.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
   inductively heating a component having a coating;
   measuring a rate of radiation emission from the coating from inductively heating the component while a cooling fluid is flowing through one or more cooling holes extending through at least part of the component and through the coating; and
   determining a quality of a bond between the coating and the component based on the rate of radiation emission that is measured.

2. The method of claim 1, wherein the quality of the bond is determined as a function of location on the component.

3. The method of claim 1, wherein the quality of the bond is determined to be stronger for faster rates of radiation emission than for slower rates of radiation emission.

4. The method of claim 1, wherein measuring the rate of radiation emission includes measuring the rate at which infrared radiation is emitted from the coating.

5. The method of claim 1, wherein determining the quality of the bond includes calculating a derivative of the rate of radiation emission and basing the quality of the bond on the derivative that is calculated.

6. The method of claim 5, wherein the derivative that is calculated includes a difference between a first rate of radiation emission at a first location on the coating and a second rate of radiation emission at a different, second location on the coating.

7. The method of claim 1, further comprising determining a remaining useful life of the coating based on the quality of the bond that is determined.

8. The method of claim 1, wherein the coating is a thermal barrier coating.

9. The method of claim 1, further comprising restoring at least a portion of the coating responsive to determining that the quality of the bond between the coating and the component is below a designated threshold.

10. A coating analysis system comprising:
    a heating system configured to inductively heat a component having a coating; and
    an inspection system configured to measure a rate of radiation emission from the coating from inductively heating the component while a cooling fluid is flowing through one or more cooling holes extending through at least part of the component and through the coating, the inspection system also configured to determine a quality of a bond between the coating and the component based on the rate of radiation emission that is measured.

11. The coating analysis system of claim 10, wherein the inspection system is configured to determine the quality of the bond as a function of location on the component.

12. The coating analysis system of claim 10, wherein the inspection system is configured to determine a stronger quality of the bond for faster rates of radiation emission than for slower rates of radiation emission.

13. The coating analysis system of claim 10, wherein the inspection system is configured to measure the rate of radiation emission by measuring the rate at which infrared radiation is emitted from the coating.

14. The coating analysis system of claim 10, wherein the inspection system is configured to determine the quality of the bond by calculating a derivative of the rate of radiation emission and basing the quality of the bond on the derivative that is calculated.

15. A method comprising:
    inductively heating a component having a thermal barrier coating while a cooling fluid flows through one or more cooling holes that extend through the component and the thermal barrier coating;
    measuring rates of infrared radiation emission from the thermal barrier coating from inductively heating the component at different locations on the component and the thermal barrier coating; and
    determining relative tensile strengths of bonds between the thermal barrier coating and the component at the different locations based on the rates of infrared radiation emission that are measured.

16. The method of claim 15, wherein the tensile strengths of the bonds are determined to be greater for faster rates of radiation emission than for slower rates of radiation emission.

17. The method of claim 15, wherein determining the tensile strengths of the bonds includes calculating one or more derivatives of the rates of infrared radiation emission and basing the tensile strengths of the bonds on the one or more derivatives that are calculated.

18. The method of claim 15, further comprising determining a remaining useful life of the thermal barrier coating based on the tensile strengths of the bonds that are determined.

19. The method of claim 15, further comprising restoring at least a portion of the thermal barrier coating responsive to determining that at least one of the tensile strengths of the bonds between the thermal barrier coating and the component is below a designated threshold.

* * * * *